United States Patent [19]

Blackwell

[11] 4,418,092

[45] Nov. 29, 1983

[54] PRESERVATION OF HOPS

[76] Inventor: Churchill G. Blackwell, 1008 S. Cherry, Unit B-101, Denver, Colo. 80222

[21] Appl. No.: 345,775

[22] Filed: Feb. 4, 1982

[51] Int. Cl.$^3$ .................... C12C 3/04; C12C 9/02
[52] U.S. Cl. ................... 426/600; 426/16; 426/29
[58] Field of Search ............... 426/16, 29, 600, 651

[56] References Cited

U.S. PATENT DOCUMENTS

| | | | |
|---|---|---|---|
| 3,442,657 | 5/1969 | Bonnet et al. | 426/600 X |
| 3,607,298 | 9/1971 | Mitchell et al. | 426/600 |
| 3,758,310 | 9/1973 | Briem | 426/600 |
| 4,049,834 | 9/1977 | Barwald et al. | 426/600 X |

OTHER PUBLICATIONS

Rose, A. H., Alcoholic Beverages, Economic Microbiology, vol. 1, Academic Press, N.Y., 1977 (pp. 73-80).

Primary Examiner—David M. Naff
Attorney, Agent, or Firm—Timothy J. Martin; James R. Young

[57] ABSTRACT

A composition and method for preserving hops at room temperature utilizes the inherent properties of fermentable hydroscopic powders to retain essential volatile oils and hop acids for extended periods of time. The composition is an intimate mixture of a fermentable hydroscopic powder such as maltose and dextrose and granulated hops having a low moisture content. This composition is prepared by reducing the size of the hops to a granular size and mixing the hops intimately with an equal or greater weight of hydroscopic powder.

10 Claims, No Drawings

PRESERVATION OF HOPS

BACKGROUND OF THE INVENTION

The brewery industry is perhaps one of the oldest continuous industries with which man has been involved. While most modern brewery companies produce products that are quite comparable in overall appearance and taste, different breweries do vary the ratios of ingredients to achieve variations in flavor. One of the flavor ingredients varied by breweries is hops which is utilized in virtually all brewing processes for beer and ale products. The hops contain both essential oils that give aroma to the product and hop acids that provide the bitterness desireable in the product. Accordingly, variation in the amount of the essential oils and beer acids placed in the beer or ale affects the flavor; this mandates careful control of the quality and quantity of hops used in the brewing process.

Hops, however, is a seasonal crop having a very limited time of harvest which necessitates preservation of hops for 12 months or more in order to be used year round. Preservation of hops, therefore, is a problem that has long confronted the brewing industry. During the storage process it is imperative to protect the hops from heat and exposure to air since the heat can cause vaporization of the essential oils from the hops and air or a combination of air and heat can result in oxidation of the hops which causes an "off" flavor. In any event, unless the brewer is able to maintain consistency in the quality of hops, the beer or ale produced may vary in taste from batch to batch as a result of the variation in the amount of essential oils and hop acids present in the product. Accordingly, it has been necessary to find ways of storing hops which maintain the levels of essential oils and hop acids at fairly constant levels.

Such present methods of preservation of the hops include refrigerating the hops, sealing the hops in a vacuum, pelletizing the hops and sealing them in a vacuum, and extracting the essential oils and acids for storage; these techniques, however, have several drawbacks. For example, both refrigerating fresh hops and vacuum sealing of fresh hops require large storage spaces and are accordingly expensive to employ. In addition, these techniques consume large amounts of energy either in the packaging process or in the maintenance of the fresh hops at refrigerated temperatures. While pelletizing and sealing the hops in a vacuum reduces the storage space, it also is a fairly expensive process to carry out. Finally, extraction of the essential oils and beer acids has the drawback of altering the flavor of beer which uses the extracted product as one of its ingredients.

In addition to hops, common beer and ale recipes call for the inclusion of dextrose (glucose) in the form of corn or rice sugar and maltose in the form of a liquid or dry malt extract. Maltose and dextrose, in a dry form, are very hydroscopic and exhibit high absorptive and adsorptive characteristics. In contrast to hops, both of these substances have a relatively stable shelf life at room temperature so that they can be stored for substantial periods of time without refrigeration. It is thus desireable to utilize the shelf life and other physical properties of these ingredients to extend the shelf life of hops.

SUMMARY OF THE INVENTION

It is an object of the present invention to provide a method for increasing the shelf life of hops used in the brewing industry.

It is a further object of the present invention to provide a method of storing hops without restoring to refrigeration or vacuum sealing.

Yet another object of the present invention is to provide a method of storing hops used in the brewing industry which method utilizes inherent properties of common beer ingredients to stabilize the oxidation and vaporization of the hop acids and essential oils contained in hops.

A still further object of the present invention is to provide a composite mixture of beer hops and other beer ingredients such that the desirable characteristics of hops are retained at room temperature storage for a shelf life of at least one year.

To accomplish these objects, the present invention provides a novel approach to preserving hops for substantial periods of time utilizing the stabilizing characteristics of other beer ingredients such as dextrose and maltose. More particularly, the method includes the steps of reducing fresh hops to a granular size, such as by grinding the hops to particles preferably having diameters of less than 1 millimeter, and then intimately mixing the granulated hops with a fermentable hydroscopic powder such as dried maltose or dextrose or a combination of maltose and dextrose in a ratio such that the weight percent of hops is less than or equal to the combined weight percent of maltose and dextrose. This intimately mixed product is then allowed to pack naturally under its own weight, or may be mechanically compressed to pack the mixture.

In the preferred embodiment of the present invention the moisture content of the hops is monitored and granulated hops having a moisture content of greater than 6%, and more preferably on the order of 11%, are selected for mixing with the maltose and/or dextrose. This moisture content permits a caking or packing of the intimately mixed composition, and due to the sugar and moisture content of the composition, as well as the volatile oils, a thin glaze or shell is formed about the exposed surfaces of the hop granules. This shell tends to exclude the exchange of oxygen therethrough to reduce the oxidation process and to prohibit evaporation of the hop acids and the volatile oils from the surface of the hop granules. Further, since the maltose and dextrose exhibit the physical characteristics of adsorption and absorption, the hop acids and volatile oils which do vaporize are retained in the composition.

In one form of the invention, the ratio of hops to the maltose and dextrose is made equal to the ratio of hops to the "wort" or unfermented beer solution. With this ratio, it is only necessary to add the desired quantity of water to the mixture to create an unfermented beer having a proper amount of hops for flavor and aroma. This mixture, then, is particularly adaptable as a dry beer mix for mass marketing distribution and home fermentation of beer.

DETAILED DESCRIPTION OF THE PREFERRED EMBODIMENT

The present invention relates to a novel brewing composition and a method of preparing such composition to provide more convenient storing of hops used in the brewing industry. Specifically, the present invention provides a simple, yet attractive method for extending the shelf life of hops to maintain desired levels of hop acids and volatile oils which impart flavor and aroma to beer, ale and similar products without the need to refrigerate the hops or package the hops in vacuum. While the brewing industry has been wide spread for many centuries, there has been a long felt need for such a simple effective method and such a storable product wherein the shelf life of the hops stored at room temperature is extended without resorting to expensive packaging techniques. The present invention accomplishes this by utilizing inherent properties found in common ingredients of beer and ale which properties protect the hops when mixed in the fashion described below.

Specifically, in the preferred embodiment of the present invention, fresh or even pelletized hops are reduced to small particles having a granular size on the order of 1 millimeter or less in diameter. The granulated hops are then intimately mixed, by any convenient mechanical process, with a fermentable hydroscopic powder which is preferably comprised of either maltose or dextrose (glucose) or a combination of both maltose and dextrose such as that obtained from rice or corn sugar, and commonly used in the beer industry. Preferably the granulated hops have a moisture content by weight of approximately 6% to 16%, although hops have been successfully utilized which have a moisture content as low as 0.2% by weight. It has been found experimentally that very suitable results are achieved where hops having a moisture content of approximately 11% are mixed with the hydroscopic powder.

In the preferred form of the present invention it has been found that acceptable results are achieved when the weight amount of the hydroscopic powder equals or exceeds the weight amount of granulated hops. However, the present composition is particularly adaptable for use as a home brewing mixture. Accordingly, it is desirable to form a composite mixture wherein the hops are mixed with the maltose and dextrose in a ratio corresponding to the quantity of hops necessary for producing the wort or unfermented beer solution when water is added. Thus one particularly useful ratio of hops to maltose/dextrose powder is a mixture of between 0.5% and 1.5% by weight of hops to the weight of the hydroscopic powder. When the mixture is prepared in this ratio, the addition of the desired quantity of water to form the wort results in an amount of hops appropriate to give a flavor and aroma corresponding to beers produced commercially.

In order to prepare the above described composition, then, it is necessary to first reduce a desired weight amount of hops to granular or particulate size and then intimately mix the granulated hops with an equal or greater weight of hydroscopic powder in the form of either maltose, dextrose or a combination of maltose and dextrose. Preferably, the hops are granulated to have a particulate diameter of less than 1 millimeter, with the hops having a low moisture content. Likewise, it is desirable to use hops having from 0.4% to 12% hop acids and approximately 0.5% volatile oils. With respect to the acids and oils, it should be noted that these quantities are more significant from taste and aroma considerations since the fermentable hydroscopic powder prevents the escape of whatever amount of acids and oils are present. Also it has been found that a moisture content range of 6% to 16% by weight apparently aids in preserving the hops.

The mixing of the hops and the fermentably hydroscopic powder is carried out by any mechanical stirring or tumbling process, and it is important that the temperature at which said mixing occurs or generates does not exceed the melting point of the hydroscopic powder used. For example, if the hops are mixed with a hydroscopic powder containing dextrose, the mixing should not occur at a temperature exceeding 85° C. which is approximately the melting point of the dextrose powder. Likewise, should the hydroscopic powder consist solely of maltose the mixing should not occur at temperatures exceeding 100° C. which approximates the melting point of maltose. If temperatures exceed those described above, the hydroscopic sugars may melt and form a candy-like material unsuitable for use. Naturally, after the grinding and mixing operations, the resulting powder may be packed and packaged in any convenient manner.

The above process results in a composition of hops and maltose/dextrose which can be readily stored at room temperatures for extended periods of time. Indeed, where granulated hops have been mixed with the hydroscopic powders in a ratio of 1 to 100 by weight, a storage at room temperature for a period of two years has resulted in no detectable flavor change in beer brewed from the composition. The mechanism by which such storage is realized is believed to be dependent upon both the characteristics of adsorption and absorption inherent in the powdered dextrose and maltose as well as a glazing action on a particulate level.

Specifically, it is believed that the hop acids, which include both alpha and beta acids, are absorbed from the hops into the dextrose and maltose mixture as they evaporated while the volatile oils which evaporate from the hops are adsorbed by the maltose and dextrose mixture. This adsorption and absorption occurs around the minute particles and, along with moisture evaporating from the hop granules, causes a fine coating or glaze to form about each granule's surface with this outer glaze or shell tending to prevent contact or air with the hops. This results in reduced breakdown of the hop acids or volatile oils due to oxidation. Likewise, the shell or glazes helps trap evaporated oils and acids in the hop granules to retard loss of these flavor and aroma ingredients. Thus, essentially all of the flavor and aroma components of the hops are preserved from oxidation in and evaporation from the composition, and the oils and acids are only released when the composition is mixed with water to form the unfermented beer base or wort.

Although the present invention has been described with a certain degree of particularity, it is understood that the present disclosure has been made by way of example and that changes in details may be made without departing from the spirit thereof.

I claim:

1. A brewing composition adapted for use in brewing beer or ale, comprising:

a fermentable hydroscopic powdered sugar, and granulated hops having a particle size less than or equal to one millimeter in diameter and having a moisture content of 0.2% to 16% by weight, said hops being intimately mixed with an equal or greater amount by weight of said hydroscopic powdered sugar.

2. A brewing composition, according to claim 1 wherein said hydroscopic powdered sugar includes powdered dextrose.

3. A brewing composition according to claim 1 wherein said hydroscopic powdered sugar includes powdered maltose.

4. A brewing composition according to claim 1 wherein said hops having a volatile oil content of approximately 0.5% by weight and an acid content of between 0.4% and 12% by weight.

5. A brewing composition according to claim 1 wherein the weight amount of hops is between 0.5% and 1.5% of the weight amount of said hydroscopic powdered sugar.

6. A method of preserving hops adapted for use in brewing beer or ale, comprising the steps of:
   reducing a desired weight amount of hops having a moisture content of 0.2% to 16% by weight to a granular size of at least one millimeter or less in diameter; and
   mixing said granulated hops with at least an equal weight of a fermentable hydroscopic powder, said hydroscopic powder being selected from a group consisting of powdered dextrose and powdered maltose.

7. The method according to claim 6 wherein the temperature at which said mixing occurs does not exceed 85° C. when said hydroscopic powder contains dextrose.

8. The method according to claim 6 wherein the temperature at which said mixing occurs does not exceed 100° C. when said hydroscopic powder is comprised of maltose.

9. The method according to claim 6 wherein the weight of the hops is between 0.5% and 1.5% of the weight of said hydroscopic powder.

10. The method according to claim 6 including the steps of compacting and packaging the mixture of hops and hydroscopic powder.

* * * * *